United States Patent
Jacques et al.

(10) Patent No.: US 7,714,554 B2
(45) Date of Patent: May 11, 2010

(54) FORWARD POWER CONVERTER CONTROLLERS

(75) Inventors: Russell Jacques, Withersfield (GB); Paul Ryan, Cambridgeshire (GB); Catriona McKay, Hertfordshire (GB); Vinod A. Lalithambika, Cambridge (GB); David M. Garner, London (GB); Devarahandi Indika Mahesh de Silva, Cambridgeshire (GB)

(73) Assignee: Cambridge Semiconductor Limited (GB)

( * ) Notice: Subject to any disclaimer, the term of this patent is extended or adjusted under 35 U.S.C. 154(b) by 243 days.

(21) Appl. No.: 11/732,107

(22) Filed: Apr. 2, 2007

(65) Prior Publication Data

US 2008/0239761 A1   Oct. 2, 2008

(30) Foreign Application Priority Data

Mar. 30, 2007 (GB) .................................. 7062565

(51) Int. Cl.
G05F 1/573 (2006.01)
(52) U.S. Cl. .................................. 323/282; 363/21.04
(58) Field of Classification Search ............. 363/16–20, 363/21.02, 21.03, 21.07, 41, 97, 98, 131, 363/132; 323/222, 282–285, 266
See application file for complete search history.

(56) References Cited

U.S. PATENT DOCUMENTS

| | | | |
|---|---|---|---|
| 4,415,959 A | 11/1983 | Vinciarelli | |
| 4,688,160 A | 8/1987 | Fraidlin | |
| 4,783,727 A | 11/1988 | Neumann | |
| 4,788,634 A | 11/1988 | Schlecht et al. | |
| 4,888,821 A | 12/1989 | Hamp, III et al. | |
| 5,278,748 A | 1/1994 | Kitajima | |
| 5,291,385 A * | 3/1994 | Vinciarelli | .................... 363/20 |
| 5,315,533 A | 5/1994 | Stich et al. | |
| 5,424,933 A | 6/1995 | Illingworth | |
| 5,986,901 A | 11/1999 | Weng | |
| 5,991,172 A * | 11/1999 | Jovanovic et al. | ......... 363/21.14 |

(Continued)

FOREIGN PATENT DOCUMENTS

WO    WO-99/19976 A1    4/1999

OTHER PUBLICATIONS

"United Kingdom Search Report for Application No. GB0706256.5, Dated Jun. 14, 2007", 1 Page.

(Continued)

*Primary Examiner*—Rajnikant B Patel
(74) *Attorney, Agent, or Firm*—Schwegman, Lundberg & Woessner, P.A.

(57) ABSTRACT

This invention relates to control techniques and controllers for resonant discontinuous forward power converters (RD-FCs).

A method of controlling a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, said method comprising: sensing a transformer signal, said transformer signal representing a voltage across a winding of said transformer or a resonant current in a winding of said transformer; calculating a resonance period of said RDFC from said sensed transformer signal; and controlling an off duration of said switch in response to said calculated resonance period such that a sub-harmonic oscillation in said resonant voltage across said primary winding is reduced.

20 Claims, 7 Drawing Sheets

U.S. PATENT DOCUMENTS

| | | | |
|---|---|---|---|
| 6,205,037 | B1 | 3/2001 | Fitzgerald, Jr. |
| 6,249,444 | B1 | 6/2001 | Cross |
| 6,252,781 | B1 | 6/2001 | Rinne et al. |
| 6,295,214 | B1 | 9/2001 | Matsumoto et al. |
| 6,304,463 | B1 | 10/2001 | Krugly |
| 6,314,010 | B1 | 11/2001 | Markow et al. |
| 6,396,718 | B1 | 5/2002 | Ng et al. |
| 6,760,236 | B2 | 7/2004 | Hsieh |
| 7,436,153 | B2 | 10/2008 | Logsdon |
| 2005/0152160 | A1 | 7/2005 | Fung et al. |
| 2005/0270809 | A1 | 12/2005 | Koch |
| 2007/0274108 | A1 | 11/2007 | Jacques |
| 2008/0037293 | A1 | 2/2008 | Jacques et al. |
| 2008/0239761 | A1 | 10/2008 | Jacques et al. |
| 2008/0239762 | A1 | 10/2008 | Jacques et al. |
| 2008/0239764 | A1 | 10/2008 | Jacques et al. |

OTHER PUBLICATIONS

International Application No. PCT/GB2008/050220, Partial International Search Report, 2 pgs.

"UCC38C42 25-Watt Self-Resonant Reset Forward Converter", *Reference Design*, © 2002 Texas Instruments Incorporated,(2002),10 pgs.

United Kingdom Search Report for Application No. GB0706249.0, dated Oct. 18, 2007, 1 pg.

United Kingdom Search Report for Application No. GB0706246.6, dated Jun. 14, 2007, 1 pg.

United Kingdom Search Report for Application No. GB0706249.0, dated Jun. 7, 2007, 1 pg.

Higashi, T., et al., "Voltage-Mode Resonant Forward Converter With Capacitor-Input Filter", *IEICE Transactions on Communications*, vol. E79-B, No. 1, (1996), 37-44.

Jacques, R., et al., "Forward Power Converter Controllers", *U.S. Appl. No. 11/732,108, filed Apr. 2, 2007*, 45 pgs.

Jacques, R., et al., "Forward Power Converter Controllers", *U.S. Appl. No. 11/732,140, filed Apr. 2, 2007*, 64 pgs.

"International Application Serial No. PCT/GB2008/050221, International Search Report mailed Aug. 22, 2008", 3 pgs.

Spiazzi, G., et al., "A New Soft-Switching Forward DC-DC Converter Operating in Discontinuous Conduction Mode", *Conference Proceedings, 33rd Annual IEEE Power Electronics Specialists Conference (PESC 2002), (Cairns, Queensland, Australia, Jun. 23-27, 2002)*,(2002), 1343-1348.

"International Application Serial No. PCT/GB2008/050222, International Search Report mailed Mar. 25, 2009", 3 pgs.

"U.S. Appl. No. 11/732,140 Non Final Office Action Mailed Aug. 3, 2009", 26.

"U.S. Appl. No. 11/732,108, Non-Final Office Action mailed Jun. 22, 2009", 13 pgs.

* cited by examiner

FORWARD POWER CONVERTER CONTROLLERS

RELATED APPLICATION

This application claims priority under 35 U.S.C. 119 to United Kingdom Application No. 0706256.5, filed Mar. 30, 2007, which application is incorporated herein by reference and made a part hereof.

FIELD OF THE INVENTION

This invention relates to control techniques and controllers for resonant discontinuous forward power converters (RDFCs).

BACKGROUND TO THE INVENTION

Figure 1:
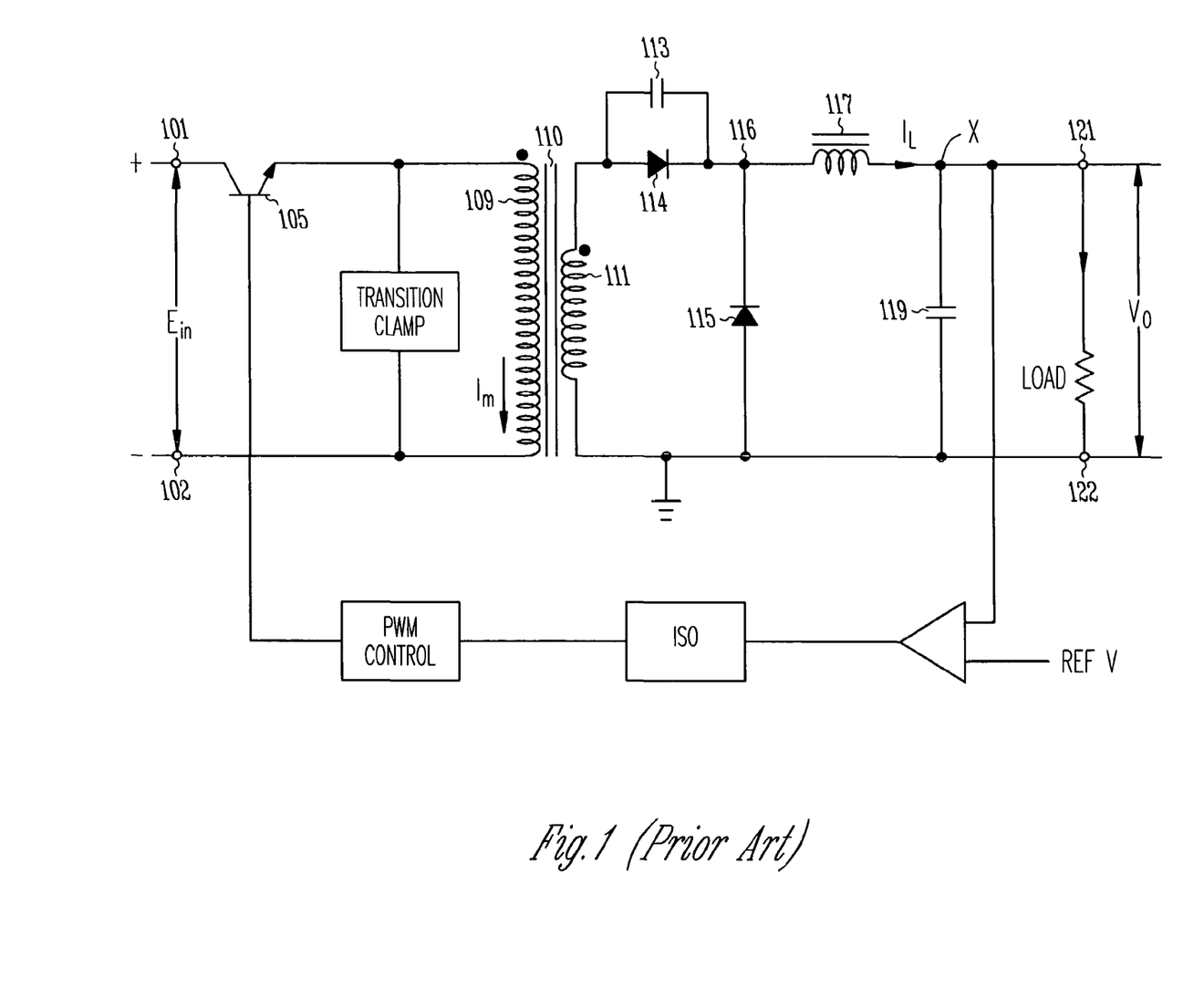
FIG. 1 shows an example of a forward converter according to the prior art.

FIG. 1 (which is taken from U.S. Pat. No. 4,688,160) shows an example of a forward power converter comprising a dc input 101, 102 coupled to the primary winding 109 of a transformer 110. The primary winding 109 is connected in series with a switching device 105, here a bipolar transistor, which switches on and off, during an on period building up magnetising flux in the primary winding 109, which drives a current in a secondary winding 111 of the transformer. Unlike a so-called flyback converter, in a forward converter the primary and secondary windings have matched polarities, as indicated by the dots on the windings in FIG. 1. The output from the transformer 110 is rectified by a rectifier 114 and smoothed by a smoothing capacitor 119 to provide a do output 121, 122. When switch 105 is off the core of the transformer is "reset" allowing the magnetising flux to return to its initial state. In the example of FIG. 1 (U.S. Pat. No. 4,688,160) this is performed by resonant action between the magnetising inductance of transformer 110 and a capacitor 113 shunting diode 114, returning energy to the input voltage source.

The circuit of FIG. 1 includes a large output choke 117 between rectifier 114 and smoothing capacitor 119, and a freewheeling or "flyback" diode 115 across the series combination of choke 117 and smoothing capacitor 119. This is because when the switch 105 is turned off, because the primary and secondary windings have the same sense, rectifier 114 immediately becomes non-conducting. The function of the freewheeling diode 115 is to allow the choke 117 to maintain a continuous output current into output node "X" when switch 105 is off by providing a path for this current.

FIG. 1 shows a conventional, continuous forward converter. There are many other prior art documents describing such converters, including, for example, U.S. Pat. No. 4,415,959; U.S. Pat. No. 6,760,236; U.S. Pat. No. 6,304,463; U.S. Pat. No. 6,252,781; EP0 074 399; and the reference design SLUA276 for the Texas Instruments UCC38C42. In some of these later circuits the secondary side diodes are replaced by synchronous rectifiers embodied in MOS transistors. Other background prior art can be found in U.S. Pat. No. 4,788,634 which describes a resonant forward converter in which natural self-inductance of the transformer in parallel with the transformer provides a resonant "ring" so that the switching circuit can be self-resonant, and US 2005/0270809 (WO 2004/057745) which describes use of an auxiliary transformer in a current limiting circuit.

We have previously described, in our earlier patent applications GB0610422.8 filed 26 May 2006 and U.S. Ser. No. 11/449,486 filed 8 Jun. 2006, how improved operation such as improved regulation and start-up may be achieved by use of switch control in a discontinuous current flow mode.

We now describe further control techniques for RDFCs.

SUMMARY OF THE INVENTION

The present invention provides a method of controlling a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, said method comprising: sensing a transformer signal, said transformer signal representing a voltage across a winding of said transformer or a resonant current in a winding of said transformer; calculating a resonance period of said RDFC from said sensed transformer signal; and controlling an off duration of said switch in response to said calculated resonance period such that a sub-harmonic oscillation in said resonant voltage across said primary winding is reduced.

By controlling the off duration in response to the calculated resonance period, a sub-harmonic oscillation in the resonant voltage across the primary winding is reduced, which provides a more stable output voltage.

Preferably, calculating a resonance period of said RDFC comprises: setting a resonance period value; measuring an initial resonance period value using one or more previous converter cycles, each of said converter cycles representing a complete on and off period of said switch; and updating said resonance period value in response to said measurement.

Preferably, said updating comprises increasing said resonance period value in response to a resonant period in said one or more previous converter cycles that is greater than said resonant period value, and decreased in response to a resonant period in said one or more previous converter cycles that is less than said resonant period value.

Preferably, during start-up of said RDFC, said period is calculated using said sensed transformer signal from a first number of converter cycles following startup of said RDFC. Preferably, said first number of cycles is less than 50. Preferably, said first number of cycles is the first cycle following startup.

Preferably, said calculated resonance period is offset by an amount from one converter cycle to the next converter cycle.

Preferably, said off duration of said switch is further controlled in response to a value of said sensed transformer signal, said off duration of said switch being increased in response to an increasing sensed transformer signal.

The present invention also provides a method of reducing sub-harmonic oscillations in a resonant voltage across a primary winding of a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, said method comprising: sensing a transformer signal, said transformer signal representing a voltage across a winding of said transformer or a resonant current in a winding of said transformer; calculating a resonance period of said RDFC from said sensed transformer signal; and controlling an off duration of said switch in response to said calculated resonance period such that sub-harmonic oscillations in said resonant voltage across said primary windings are reduced.

Preferably, calculating a resonance period of said RDFC comprises: setting a resonance period value; measuring an said initial resonance period value using one or more previous converter cycles, each of said converter cycles representing a complete on and off period of said switch; and updating said resonance period value in response to said measurement.

Preferably, said updating comprises increasing said resonance period value in response to a resonant period in said one or more previous converter cycles that is greater than said resonant period value, and decreased in response to a resonant period in said one or more previous converter cycles that is less than said resonant period value.

Preferably, during start-up of said RDFC, said period is calculated using said sensed transformer signal from a first number of converter cycles. Preferably, said first number of cycles is less than 50. Preferably, said first number of cycles is the first cycle following startup.

Preferably, said calculated resonance period is offset by an amount from one converter cycle to the next converter cycle.

Preferably, said off duration of said switch is further controlled in response to a value of said sensed transformer signal, said off duration of said switch being increased in response to an increasing sensed transformer signal.

The present invention further provides a controller for controlling a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, comprising: an input to sense a transformer signal, said transformer signal representing a voltage across a winding of said transformer or a resonant current in a winding of said transformer; a system to calculate a resonance period of said RDFC from said sensed transformer signal; and an output to control an off duration of said switch in response to said calculated resonance period such that a sub-harmonic oscillation in said resonant voltage across said primary winding is reduced.

The present invention also provides a controller configured to reduce sub-harmonic oscillations in a resonant voltage across a primary winding of a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, the controller comprising: means for sensing a transformer signal, said transformer signal representing a resonant voltage across a winding of said transformer or a resonant current in a winding of said transformer; means for calculating a resonance period of said RDFC from said sensed transformer signal; and means for controlling an off duration of said switch in response to said calculated resonance period such that sub-harmonic oscillations in said resonant voltage across said primary windings are reduced.

The present invention also provides a resonant discontinuous forward converter (RDFC) including a controller according to the above statements.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

In this specification we are concerned with controlling resonant discontinuous forward converters. In an exemplary RDFC power to a primary or input winding of a transformer is switched and a secondary or output winding of the transformer, with a polarity matched to that of the primary winding, is coupled to a rectifier which provides do power to a smoothing capacitor, do power being supplied by the RDFC to its output from this connection node X. A voltage waveform on the secondary winding of the transformer has a first portion during which the switch is on current flows into the output connection node X, and second substantially resonant portion during which both the switch and the rectifier are off. Substantially no current flows into the connection node (other than from the smoothing capacitor) during the second portion of the voltage waveform.

In the designs we describe a connection between the rectifier and the connection node may include a small inductor (for example less than 5% of the primary side magnetising inductance) but substantially no current flows in this inductance during the second, resonant portion of the waveform and there is no need for a large choke of the type used in a continuous forward converter. There is no need connect a capacitor across the rectifier to achieve resonance; other connection positions are possible, for example, across a primary, secondary or auxiliary winding of the transformer. More particularly in embodiments we use the magnetising inductance of the transformer with an added capacitor on the primary side to achieve resonance in the off cycle.

In some preferred implementations the RDFC is configured for AC-DC power conversion and thus includes an AC-DC converter such as a bridge rectifier on the primary side. In some particularly preferred implementations the RDFC is mains-powered and the primary side is powered by a high dc voltage (for example greater than 70 Vdc, 100 Vdc, 150 Vdc or 200 Vdc) whilst the secondary side de voltage is low (for example, less than 20 Vdc or 10 Vdc). In embodiments we preferably employ minimum voltage switching on the primary side (i.e. a primary side switch is turned on at a time when a voltage across the switch is close to zero volts.

We have previously described techniques for implementing a resonant discontinuous forward converter (RDFC) which employ a control system to turn a power switch of the RDFC on and off in a controlled manner. As previously described, the control system may operate in an uncontrolled, fixed frequency mode or the control system may sense from one or more inputs and decide when to turn the power switch on and off responsive to this sensing, for example to implement pulse width and/or frequency modulation. This facilitates regulation of the RDFC which, in detail, may be performed using a range of algorithms. One technique uses the control system to operate the RDFC to compensate for circuit variables and to operate in a minimum voltage switching mode. The converter may also control the switching frequency during start-up and/or current limit in order to protect the power switch and increase the energy transferred to the load. The control system is preferably implemented using a control IC (integrated circuit).

As mentioned above, the RDFC operates without a free-wheeling or flyback diode, and with or without an output inductor. However, if present the output inductor is sufficiently small to ensure that the forward converter operates in a discontinuous mode and substantially resonantly that is at or close to resonance.

Within an RDFC, the timing of the primary power switch has to be: in accordance with the resonance of the isolating transformer and other components forming part of the resonating circuit; managed to control the power transfer to the output; and appropriate to the other components (particularly the transformer) so they operate without excessive stress and within an efficient range. In preferred embodiments, timing is set by a controller, which determines the time to turn the primary switch on and how long to leave it on.

Figure 2:
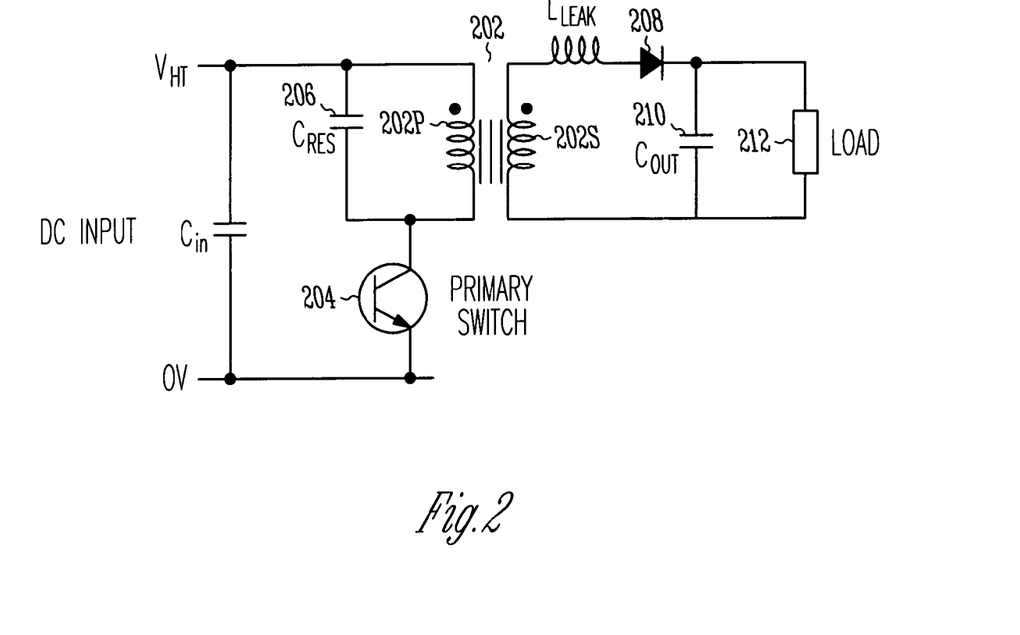
FIG. 2 shows a basic circuit diagram of an RDFC.

FIG. 2 shows a basic arrangement of an RDFC 200, comprising an isolating transformer 202 having primary $202_P$ and secondary $202_S$ windings. A switch 204, when closed, applies a DC voltage $V_{ht}$ across the primary winding of the transformer. Power is delivered to the load 212 via a rectifying diode 208 and smoothing capacitor 210. The polarity of the transformer is such that power is supplied to the output circuit when the primary switch is closed. Inductance $L_{leak}$ may be a discrete component or may be a characteristic of the transformer itself, in which case it can be modelled as an inductor in either the primary circuit or the secondary circuit, or both. The magnitude of $L_{leak}$ affects the behaviour and performance of the converter. For applications requiring more stable voltage regulation $L_{leak}$ is normally lower in value; for applications requiring a higher converter output impedance (such as battery chargers), its value is set higher.

Figure 3A:
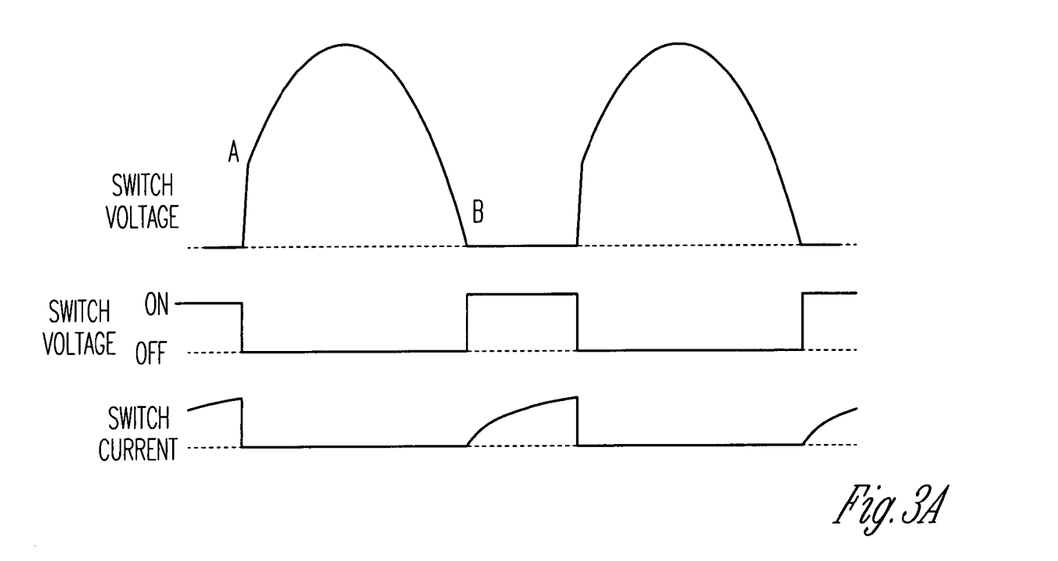
FIGS. 3a, 3b, 3c, 3d and 3e show example waveforms of converter operation.

Example waveforms of converter operation are shown in FIG. 3a. When switch 204 is in the On state, current flows through the switch and transformer primary. The current rises in accordance with load conditions and the effect of $L_{leak}$. At switch-off, the voltage rises rapidly (reflected load current in $L_{leak}$) to point "A". Once energy has been transferred out of the leakage inductance, the circuit resonates as the combination of $C_{res}$ 206 and the magnetising inductance of the transformer $L_{mag}$, and other stray reactances. During resonance, the switch voltage reaches a peak then reduces. Depending on circuit values and conditions, it may reach 0V ("B"). Depending on the characteristics of circuit components, the switch voltage may be prevented from resonating below 0V either by diodes associated with the switch, or by the effect of the output diode and voltage on the output capacitor.

Figure 3B:
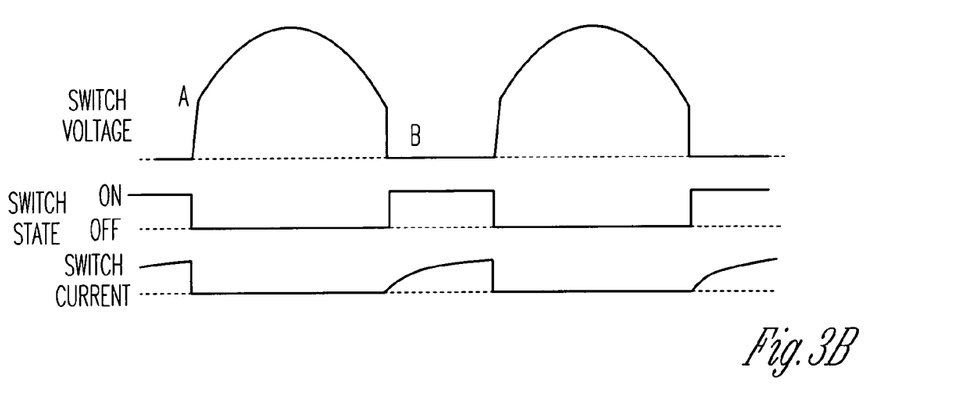
Figure 3C:
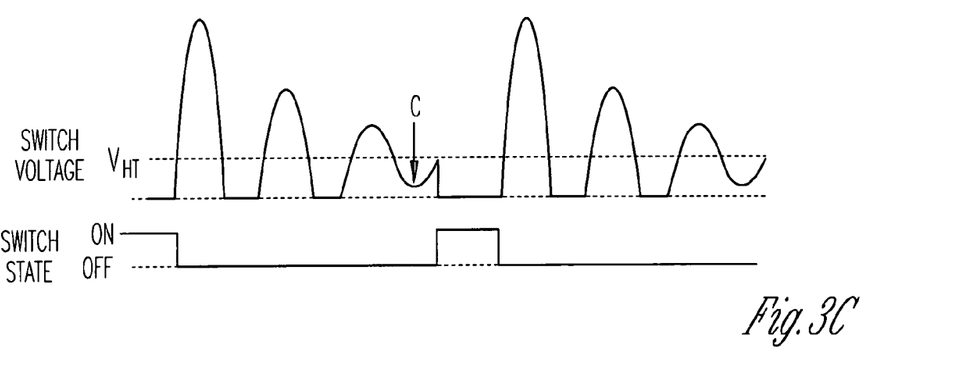

FIG. 3a shows the switch being turned on at point "B". FIG. 3b shows example waveforms of the switch being turned on before the resonant waveform reaches point "B", and FIG. 3c (on a longer time axis) shows the switch being turned on later than point "B". In FIG. 3c, the switch waveform can be seen to oscillate as a damped sinewave around $V_{ht}$. Switching. Optimum power transfer is achieved by turning the switch on again at point "B".

It is preferable to adjust one or both of an on-time of the switch and an off-time of the switch to control the power transfer. However, the turn-on instant of the switch is preferably chosen to correspond to a minimum of the resonance of the switch voltage.

Preferably, the switch is turned on when the switch voltage is close to 0V ("B" in FIG. 3a). For situations where there is an extended off-time (as shown, for example in FIG. 3c), it is preferable to turn the switch back on when the resonant voltage is at an instant of minimum voltage (e.g. "C" in FIG. 3c); this reduces EMI and energy loss.

Figure 3D:
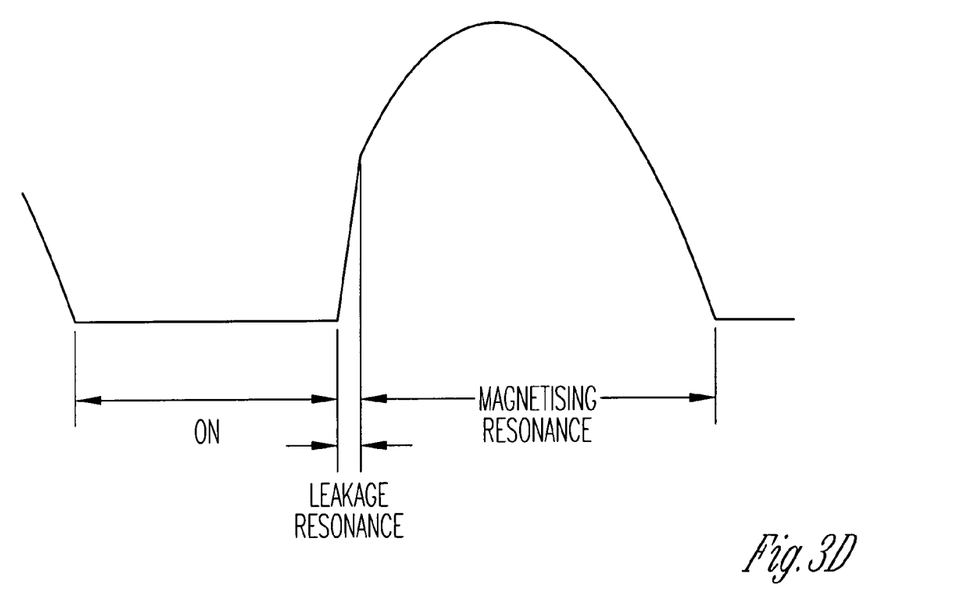

Apart from component values and parameters, the resonant waveforms observed in an RDFC vary according to load and switching conditions. FIG. 3d is a more detailed view of the waveform shown in FIG. 3a and shows the main parts of the observed resonance wave. The polarity represents the voltage across the power switch assuming a positive supply to the transformer primary and the power switch is connected in the other connection of the primary to the negative supply.

The three main parts are:

On-period: when the power switch is turned on, connecting the transformer primary to the power source. Voltage across the switch is low. During this period current flow is principally reflected secondary (load-related) current and magnetising current rising according to the primary inductance and supply voltage etc.

Leakage resonance: In this period, current continues to flow in the secondary. The primary voltage is a (fast) resonance of the leakage inductance with the resonant capacitance. The magnitude of this resonant voltage depends on the current at turn-off and the leakage inductance. The former is typically mostly the reflected secondary current, but there may be a small contribution from magnetising current, depending on circuit parameters. Typically, this resonance is fast and the turnoff time of the switch may be significant so the exact waveform is complex.

Magnetising resonance: Once the secondary current has substantially decayed, the wave results from resonance of the magnetising inductance and the resonant capacitance. The amplitude depends on the magnetising current at the end of the on-period which depends on the magnetising current at the beginning of the on-period, the supply voltage and the duration of the on-period etc.

As load and switching conditions vary, the principal effects are:

Amplitude and duration of the leakage resonance increases with the sum of reflected load current and magnetising current. These scale according also to the magnitude of the leakage inductance.

Amplitude of the magnetising resonance increases with on-period and supply voltage. Duration of the magnetising resonance depends on the magnetising current remaining at the end of the leakage resonance and the voltage at that time.

Figure 3E:
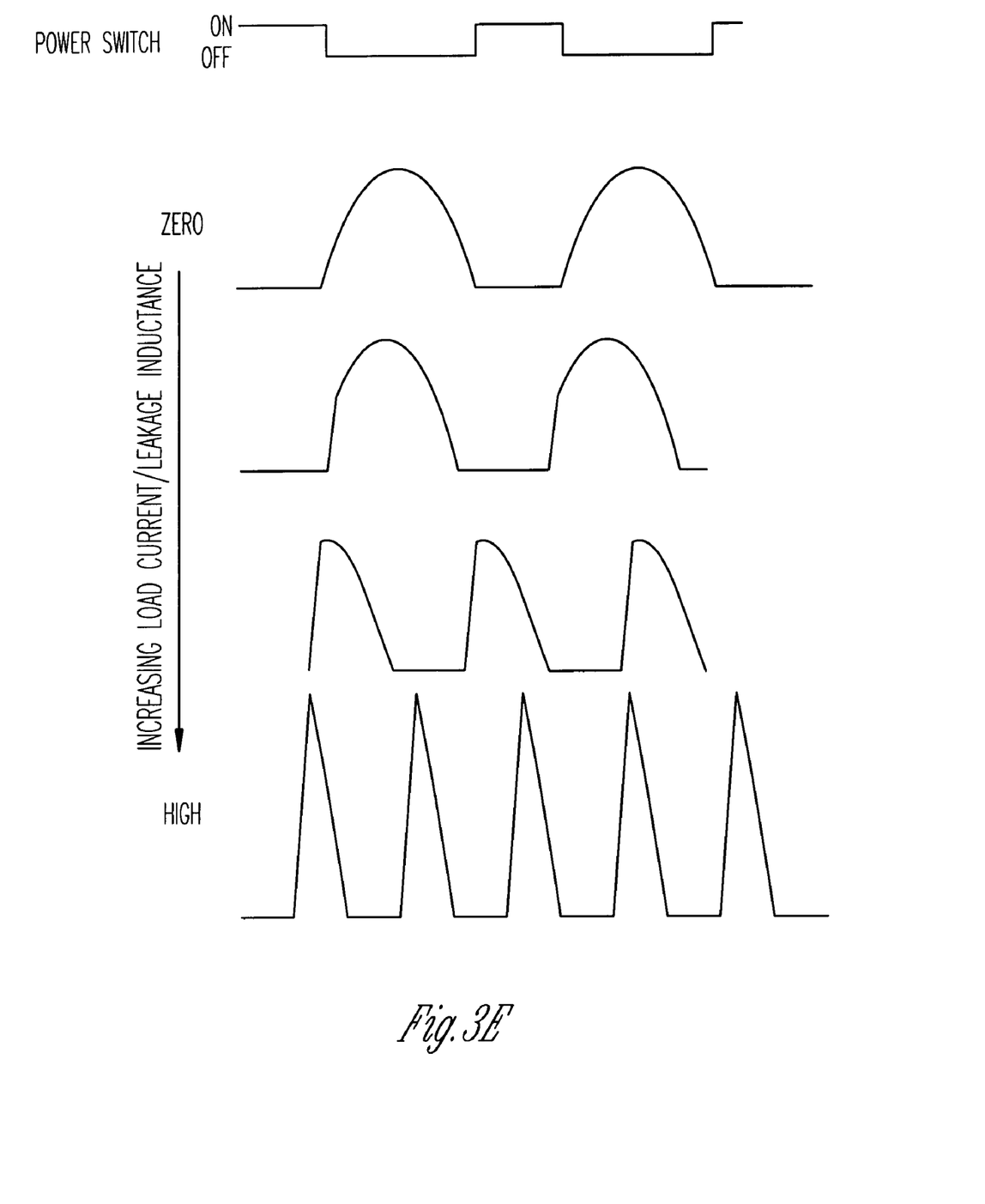

Typical waveforms are illustrated in FIG. 3e; all correspond to the condition where the on-period commences immediately the switch voltage reaches a minimum. Though the on-time and reflected secondary current are not necessarily dependent, in typical applications the on-period is shortened when the secondary current is high, for example in overload.

In applications where the power transfer is varied by changing the on-time and off-time of the primary switch, at least three operational modes to manage power are identifiable:

Maximum power (Maximum on-time and minimum off-time)

Medium power (Reduced on-time and minimum off-time)

Low power (Minimum on-time and extended off-time)

Preferably, the on-time is reduced before increasing off-time. Reducing the on-time minimises transformer losses, EMI and audible noise, as the core flux is reduced (consequence of reducing on-time). Minimising the off-time allows the on-time to be maximised at medium and high powers, whilst staying within allowable core flux, as this maximises the reverse magnetising current from the previous cycle.

Preferably, change of mode is performed on the basis of the measured primary switch current and its rate of rise, but a further choice is the rate at which the controlled parameters (on-time and off-time) are changed in response to the measured current. If the controlled parameters change slowly then the system will also respond slowly to changing conditions, possibly leading to undesirable voltage excursions.

Figure 4:
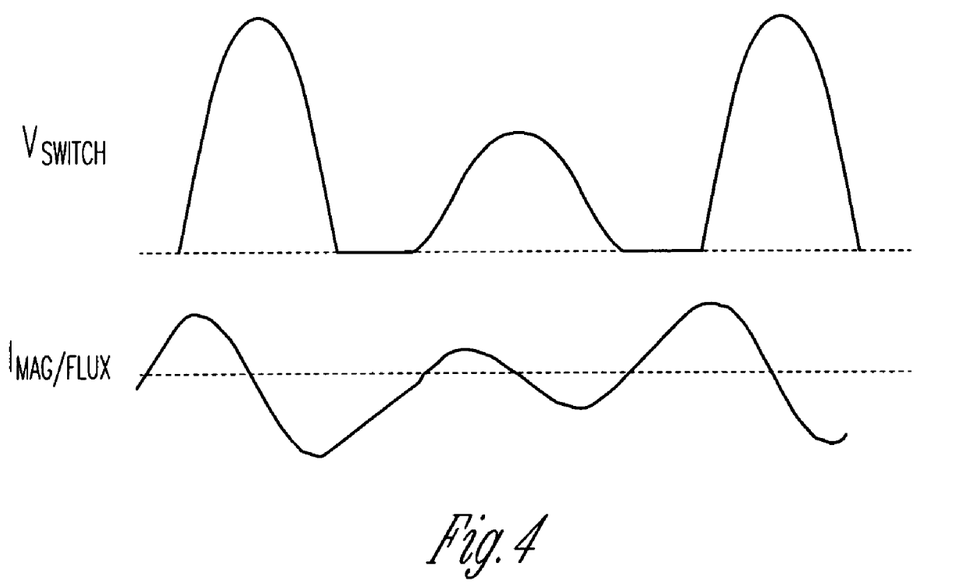
FIG. 4 shows a sub-harmonic oscillation in a resonant voltage waveform.

If the turn-on time of the switch is dependent solely on completion of the previous resonance (to a point of low dV/dt) an undesired low-frequency (sub harmonic) oscillation may occur. In FIG. 4 we see alternating cycles of converter operation, each with the same on-time, but varying off-times. As described above, the off-time is governed by the completion of resonance, the duration of which depends on the core magnetisation in the preceding cycle.

Symptomatically, an alternate high and low voltage resonance is observed in the $V_{switch}$ signal. In extreme cases, these fluctuations may cause damage to the switch in the off-state.

In embodiments of the present invention, it is preferable to adjust the off-time so that it does not solely depend on the resonance of the preceding cycle to suppress this behaviour.

In the preferred method, a resonance time is calculated based on two or more previous converter cycles. The off-time is then forced to be the same as this calculated resonance time. The subsequent turn-on of the primary switch is therefore set by the calculated resonance time, rather than to the resonant waveform itself, which may reduce the sub-harmonic oscillation in the resonant voltage.

Furthermore, the resonance time may be calculated in a way that changes slowly from cycle-to-cycle so that, as a minimum, the half-rate subharmonic oscillation is reduced.

The resonance period is characteristic of a particular resonant system and will vary particularly with transformer primary inductance. This is beneficial because a larger winding inductance generally allows longer on-time within core limitations, other conditions being similar. When choosing parameters for a converter, it is necessary to take into account transformer construction limitations, Switch voltage limit and other issues such as operating frequency (to avoid audible noise). Higher inductance allows longer on-time, which is in accordance with core flux limitation. Lower resonating capacitance leads to shorter on-time, which reduces core energy so that peak switch voltage is limited despite reduced capacitance.

ResEstSig is an estimate of the resonant portion of the primary signal and is derived from the time between a first and second event associated with the switch being switched off. Preferably this is between turn-off of the switch and the first trailing edge of a falling signal (Sf) that represents a portion of the voltage across the switch during which the rate of decrease of the voltage is greater than a falling threshold value. Preferably the measurement is taken using a trailing edge of Sf that coincides with the end of the resonant signal. ResEstTime is derived from ResEstSig and is an estimate of the resonance time.

Figure 6A:
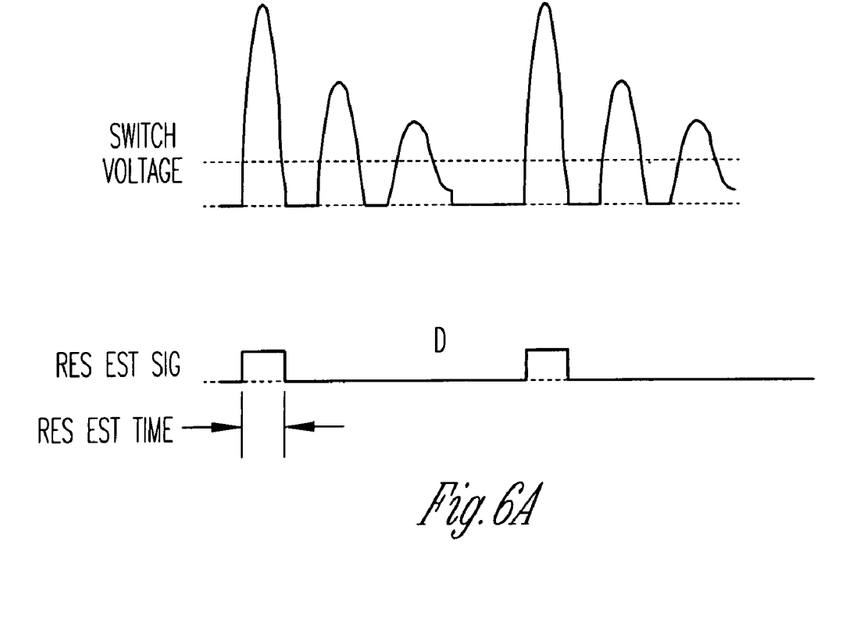
FIG. 6a illustrates signal ResEstSig.

FIG. 6a illustrates ResEstSig.

To measure this reliably it is preferable that the or turn-off time of the switch is short or predictable, so any delay in switching is small or can be corrected. Alternatively, the leading edge of a rising signal (Sr) may be used to mark the start of the resonance. Sr represents a portion of the voltage across the switch during which the rate of increase of the voltage is greater than a rising threshold value.

Following the start of the resonance time period, it is preferable to ignore or not detect any transitions in signal Sf for a period Sf(a). This prevents transitions in the early part of the resonance wave from registering as the true resonance.

Following the first rising transition of Sf, it is preferable to ignore or not detect subsequent transitions in Sf for a period Sf(b). This prevents transitions in Sf around the peak of the waveform, where the rate of change of the signal is near the falling threshold value, from causing errors. Further, the condition of "first transition" can be reset should a state of Sr=true subsequently be recognised. This avoids the possible problem where the early part of the resonance wave from registering as the true resonance is recognised, leading to a subsequent error if noise from the rate of change of the signal being near the falling threshold value occurs in the same resonance.

The next falling edge of Sf can then be used to indicate the end of the resonance for the purpose of resonance estimation.

To allow for a wide range of resonance timing, it is preferable to use times for Sf(a) and Sf(b) that vary with the measured ResEstTime, for example:

Sf(a)=¼ of ResEstTime

Sf(b)=¹⁄₁₆ of ResEstTime

However, fixed times can be used for either or both.

Figure 6B:
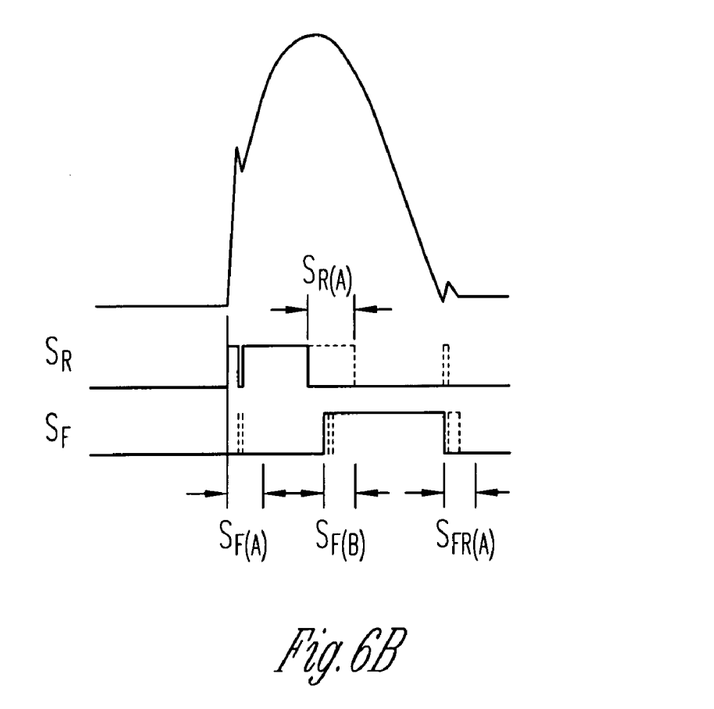
FIG. 6b illustrates extension and blanking periods of signals Sr and Sf.

FIG. 8b illustrates extension and blanking periods of signals Sr and Sf.

There is a difficulty, however, when the actual resonance time is longer than the off-time used for that particular cycle, in that the resonance cannot be observed to completion in order to calculate an appropriate calculated resonance time value. It is therefore preferable to infer the resonance in such circumstances.

A possible solution would be to monitor the resonating waveform and fitting a synthetic wave to it; the synthetic waveform then giving access to the theoretical resonance time. However, this is a complex calculation and difficult to perform at low cost.

A preferred, and simplified solution, would be to observe the resonance and determine simply if the resonance completes before or after the current estimate of resonance time. If the resonance completes before the current estimate, then the estimate can be reduced by a small amount. Conversely, if the resonance completes after the estimate, the estimate is increased.

Over a period of time, the resonance estimate will tend to track the actual resonance time, but with an averaging effect and some lag. This may be adequate in applications where the resonance time does not change quickly, but further optional techniques are preferred to handle dynamic conditions:

Start-up: measure the resonance of the first cycle (off-period) and use this value to set the initial resonance estimate Resonance very short: if the observed resonance is significantly shorter than the present estimate, either decrease the estimate more quickly (larger change), or set the estimate directly to the observed value Resonance very long: if the observed resonance is significantly longer than the present estimate, either increase the estimate more quickly (larger change), or set the estimate directly to the observed value Estimate in error for several cycles: if, for several cycles, the resonance is observed to be always late or always early in comparison to the estimate, then increase the rate of change of the estimate.

An alternative or additional method to suppress sub-harmonic oscillation is to observe the resonant current (through the resonant capacitor, or part thereof) or the integral of the current on a cycle-by cycle basis. Like the resonant time, this gives information about sub-harmonic variations and may be used to adjust the off-time to counteract any oscillatory behaviour. For example, the forced off-time can be made up of two components, one equal to the tracked resonance time and a second, smaller, component which depends on the current. It is arranged so that a higher current increases the off-time to attempt to counteract the tendency to oscillation.

Alternatively, the magnitude of resonant current sensed in one off-period may be used to alter the duration of the subsequent on-period. Subject to any other power or voltage regulation controls, a high resonant current is arranged to cause an increase in duration of the on-period with the objective of stabilising the magnetic energy in the transformer at the end of the on-period.

To minimise size and cost of power converters, it is preferable to use the maximum available range of flux in the transformer core, limited by the characteristics of the core material. In resonant operation, there may be a "negative" flux in the core at the beginning of the on-period of the power switch. During the on-period, the core flux increases (tends to more positive) and reaches a maximum approximately at the end of the on-period.

On-period is a primary means of control of power delivery, enabling reduction of power in response to light load or overload. In a particular design of power converter it is necessary to manage the on-period to ensure that a large, but not excessive, flux range is used. In resonant converters, the negative flux at the beginning of the on-period may be significant in reducing the peak positive flux at the end of the period. This can cause difficulties when the on-period or off period are changed, because both affect the negative flux at the beginning of the on-period.

If the on-period is increased in one converter cycle compared to the previous, the negative flux at the beginning of the on-period may be insufficient to limit the flux at the end to an acceptable level. To avoid this problem, it is preferable to limit the rate of increase of in-period between successive cycles. The increase between cycles may be simply at a fixed predetermined rate or, preferably, at a rate determined from the maximum on-period (itself may be determined from the estimated resonance time), such as a fraction of the maximum on-period.

Changes to the off-period affect the negative core flux at the beginning of the next cycle in complex ways. Firstly, the flux oscillates due to the resonant behaviour and secondly, it tends to decay as a result of circuit losses. As described elsewhere, to manage power delivery it is preferable to reduce the on-period before increasing the off-period. In these circumstances, there is no risk of excessive core flux provided the on-period is reduced to a relatively low value before the off-period is increased.

The control techniques described here may be embodied in a system at low cost with few components. Preferably, an integrated controller device works with a low-cost power bipolar transistor to make an off-line power converter with several commercial advantages, including: high power capability despite small and low-cost components; the use of bipolar power switch transistor rather than the higher-cost alternative of power mosfet or IGBT; compact size; low power loss in low/no-load conditions; and high conversion efficiency.

Figure 5:
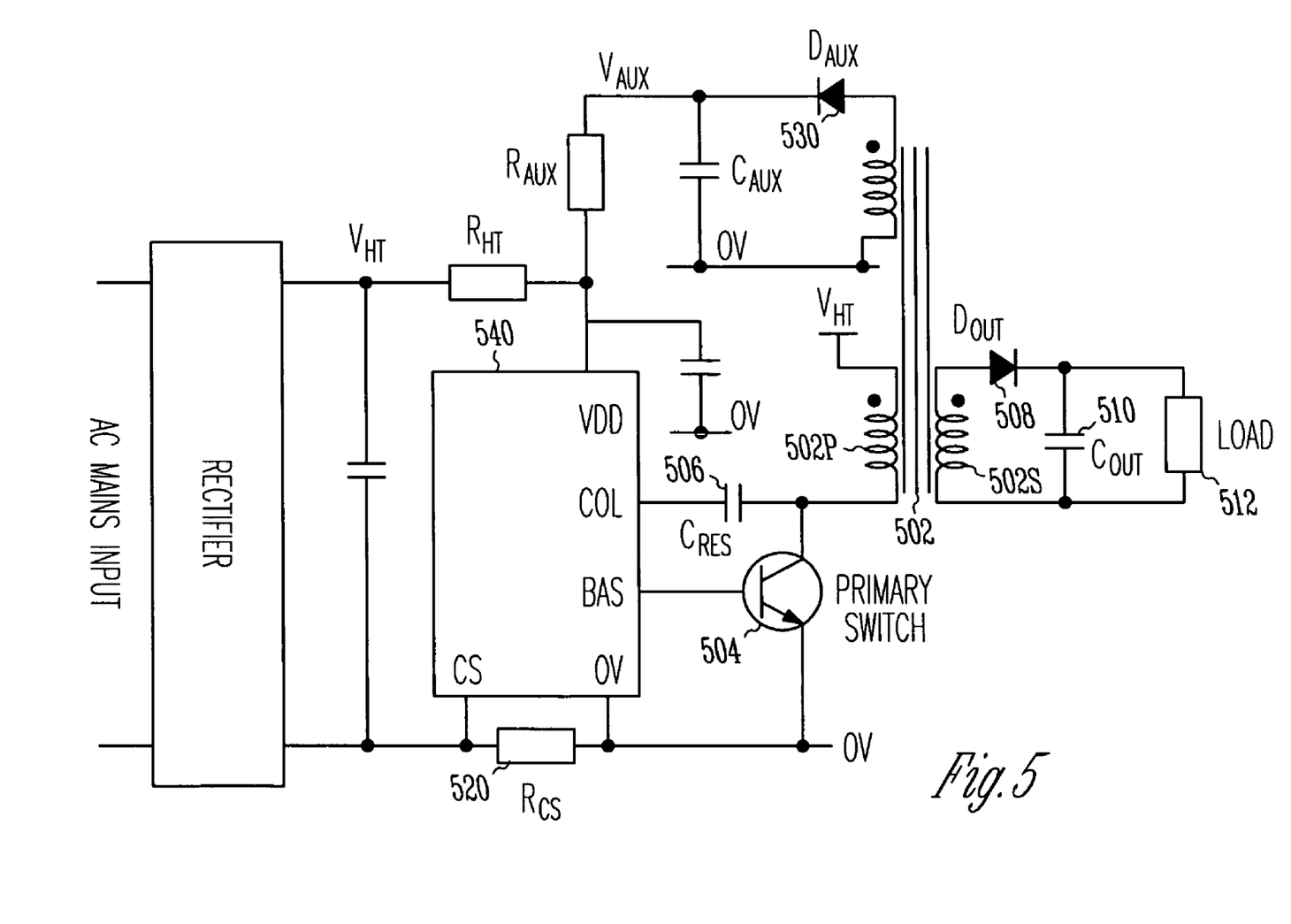
FIG. 5 shows an example RDFC according to the present invention.

FIG. 5 shows an example RDFC 500 with such a controller. The RDFC comprises an isolating transformer 502 having primary $502_P$ and secondary $502_S$ windings. A switch 504, when closed, applies a DC voltage $V_{ht}$ across the primary winding of the transformer. Power is delivered to the load 512 via a rectifying diode 508 and smoothing capacitor 510. The polarity of the transformer is such that power is supplied to the output circuit when the primary switch is closed.

The RDFC further comprises an RDFC controller 540. The controller preferably includes both analog and digital circuits to implement the above-mentioned control functions in accordance with the present invention. Preferably, the controller is fabricated in a low-cost conventional CMOS process.

The controller 540 is AC coupled to the primary winding of the transformer to sense a primary signal via a resonance capacitor 506, which also acts as the resonance capacitor for the RDFC. It is particularly advantageous for the capacitor to serve both functions; high voltages typically occur during converter operation and capacitors capable of withstanding them are expensive. Alternatively, two or more capacitors could be employed, one to couple signal to the controller and the other to supplement the resonance. This may be necessary in high power converters where the resonant current is high and unsuitable for applying in its entirety to the controller input. Optionally, the resonance may be coupled to the controller from a winding of the transformer other than the primary winding, the auxiliary winding for example. Furthermore, the primary switch current is sensed by a single resistor $R_{cs}$ 520.

The controller is configured to provide a drive signal to the primary switch in response to the above-sensed signals.

Auxiliary power for the controller device and for base current to the primary switch is derived from an additional winding on the converter transformer, shown in this instance operating in a forward mode. This mode is preferred as it minimises the range of auxiliary voltage $V_{aux}$ under conditions of varying duty cycle and load.

High loads (reduced or zero output voltage) tend to reduce $V_{aux}$ via the transformer action. Therefore, it is preferred to include a shunt-mode voltage regulator in the controller device and supply via a resistor ($R_{aux}$) from $V_{aux}$ to avoid malfunction of the controller. In this way, an accurate controller supply voltage can be provided despite changes in input voltage and load conditions.

However, a wide range of $V_{aux}$ can still lead to high power dissipation, which is undesired, especially in no/low-load conditions. Preferably, the effect of load on $V_{aux}$ is minimised by the construction of the transformer. For example, the winding sequence can be constructed (from core outwards): Auxiliary, Primary and then Secondary. Furthermore, the secondary winding leakage inductance can be increased by winding over a reduced length of core, in comparison to the width of the primary and auxiliary windings.

To enable the controller to startup correctly from an unpowered state, power is preferably taken from the rectified high voltage supply via high value resistor $R_{ht}$.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. A method of controlling a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, said method comprising:

sensing a transformer signal, said transformer signal representing a voltage across a winding of said transformer or a resonant current in a winding of said transformer;

calculating a resonance period of increasing and reducing of a resonant voltage of said primary winding of said RDFC from said sensed transformer signal; and controlling an off duration of said switch in response to said calculated resonance period such that a sub-harmonic oscillation in said resonant voltage across said primary winding is reduced.

2. A method according to claim 1, wherein calculating a resonance period of said RDFC comprises:

setting a resonance period value;

measuring an initial resonance period value using one or more previous converter cycles, each of said converter cycles representing a complete on and off period of said switch; and updating said resonance period value: in response to said measurement.

3. A method according to claim 2, wherein said updating comprises increasing said resonance period value in response to a resonant period in said one or more previous converter cycles that is greater than said resonant period value, and decreased in response to a resonant period in said one or more previous converter cycles that is less than said resonant period value.

4. A method according to claim 2 wherein, during start-up of said RDFC, said period is calculated using said sensed transformer signal from a first number of converter cycles following startup of said RDFC.

5. A method according to claim 4, wherein said first number of cycles is less than 50.

6. A method according to claim 5, wherein said first number of cycles is the first cycle following startup.

7. A method according to claim 1, wherein said calculated resonance period is offset by an amount from one converter cycle to the next converter cycle.

8. A method according to claim 1, wherein said off duration of said switch is further controlled in response to a value of said sensed transformer signal, said off duration of said switch being increased in response to an increasing sensed transformer signal.

9. A method of reducing sub-harmonic oscillations in a resonant voltage across a primary winding of a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, said method comprising:

sensing a transformer signal, said transformer signal representing a voltage across a winding of said transformer or a resonant current in a winding of said transformer;

calculating a resonance period of increasing and reducing of a resonant voltage of said primary winding of said RDFC from said sensed transformer signal; and controlling an off duration of said switch in response to said calculated resonance period such that sub-harmonic oscillations in said resonant voltage across said primary windings are reduced.

10. A method according to claim 9, wherein calculating a resonance period of said RDFC comprises:

setting a resonance period value;

measuring an said initial resonance period value using one or more previous converter cycles, each of said converter cycles representing a complete on and off period of said switch; and updating said resonance period value in response to said measurement.

11. A method according to claim 10, wherein said updating comprises increasing said resonance period value in response to a resonant period in said one or more previous converter cycles that is greater than said resonant period value, and decreased in response to a resonant period in said one or more previous converter cycles that is less than said resonant period value.

12. A method according to claim 10 wherein, during start-up of said RDFC, said period is calculated using said sensed transformer signal from a first number of converter cycles.

13. A method according to claim 12, wherein said first number of cycles is less than 50.

14. A method according to claim 13, wherein said first number of cycles is the first cycle following startup.

15. A method according to claim 9, wherein said calculated resonance period is offset by an amount from one converter cycle to the next converter cycle.

16. A method according to claim 9, wherein said off duration of said switch is further controlled in response to a value of said sensed transformer signal, said off duration of said switch being increased in response to an increasing sensed transformer signal.

17. A controller for controlling a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, comprising:

an input to sense a transformer signal, said transformer signal representing a voltage across a winding of said transformer or a resonant current in a winding of said transformer;

a system to calculate a resonance period of increasing and reducing of a resonant voltage of said primary winding of said RDFC from said sensed transformer signal; and an output to control an off duration of said switch in response to said calculated resonance period such that a sub-harmonic oscillation in said resonant voltage across said primary winding is reduced.

18. A controller configured to reduce sub-harmonic oscillations in a resonant voltage across a primary winding of a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, the controller comprising:

means for sensing a transformer signal, said transformer signal representing a resonant voltage across a winding of said transformer or a resonant current in a winding of said transformer;

means for calculating a resonance period of increasing and reducing of a resonant voltage of said primary winding of said RDFC from said sensed transformer signal; and means for controlling an off duration of said switch in response to said calculated resonance period such that sub-harmonic oscillations in said resonant voltage across said primary windings are reduced.

19. A resonant discontinuous forward converter (RDFC) including a controller according to claim 17.

20. A resonant discontinuous forward converter (RDFC) including a controller according to claim 18.

* * * * *